US012483609B2

(12) United States Patent
Juneja et al.

(10) Patent No.: US 12,483,609 B2
(45) Date of Patent: Nov. 25, 2025

(54) PROVISIONAL RESPONSE HANDLING IN SIP CALLS

(71) Applicant: Oracle International Corporation, Redwood City, CA (US)

(72) Inventors: Rohit Juneja, Stittsville (CA); Rajat Srivastava, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/318,188

(22) Filed: May 16, 2023

(65) Prior Publication Data

US 2024/0388610 A1 Nov. 21, 2024

(51) Int. Cl.
*H04L 65/1104* (2022.01)
*H04L 47/625* (2022.01)

(52) U.S. Cl.
CPC ...... *H04L 65/1104* (2022.05); *H04L 47/6255* (2013.01)

(58) Field of Classification Search
CPC ............. H04L 65/1104; H04L 47/6255; H04L 65/1101; H04L 65/1096; H04L 65/1016; H04L 65/1069; H04L 65/762; H04L 67/141; H04L 67/5651; H04L 69/161; H04L 12/189; H04L 51/23; H04L 51/234; H04L 65/1106; H04L 51/212; H04L 51/224; H04L 67/566; H04L 67/75; H04L 47/74; H04L 47/745; H04L 47/746; H04L 51/216; H04L 67/142; H04L 67/56; H04L 67/564; H04L 67/567; H04W 28/10; H04W 28/12; H04W 28/14; H04W 76/18; H04W 76/19; H04W 76/38; H04W 24/00; H04W 24/02; H04W 24/04; H04W 24/06; H04W 24/08; H04W 24/10
See application file for complete search history.

(56) References Cited

U.S. PATENT DOCUMENTS 11,240,176 B2 * 2/2022 Zhao ................. H04L 47/283
2005/0147086 A1 * 7/2005 Rosenberg ........... H04Q 3/0025
370/352

(Continued)

OTHER PUBLICATIONS

K. K. Guduru and J. Usha, "Queuing strategies for self overload control in SIP servers," 2014 International Conference on Contemporary Computing and Informatics (IC3I), Mysore, India, 2014, pp. 1007-1011, doi: 10.1109/IC31.2014.7019601. (Year: 2014).*

(Continued)

*Primary Examiner* — Greg C Bengzon

(57) ABSTRACT

Various embodiments of the present technology generally relate to systems and methods for provisional response handling in session initiation protocol (SIP) calls, to maintain performance during directed denial of service (DDoS) attacks or bursts of response messages. A proxy server for SIP calls may initiate processing of a first SIP response, receive a second SIP response, and add the second SIP response to a message queue. The proxy server may then receive a third SIP response having a response identifier, compare the response identifier to responses in the message queue, and drop the third SIP response based on the response identifier matching a response in the message queue.

19 Claims, 7 Drawing Sheets

(56) References Cited

U.S. PATENT DOCUMENTS

| | | | |
|---|---|---|---|
| 2007/0121596 A1* | 5/2007 | Kurapati | H04M 3/436 |
| | | | 370/356 |
| 2008/0253387 A1* | 10/2008 | Liang | H04L 67/62 |
| | | | 370/412 |
| 2010/0142382 A1* | 6/2010 | Jungck | H04L 63/10 |
| | | | 370/242 |
| 2014/0019626 A1* | 1/2014 | Hubler | H04L 67/54 |
| | | | 709/227 |
| 2014/0201838 A1* | 7/2014 | Varsanyi | G06F 21/552 |
| | | | 726/23 |
| 2014/0289840 A1* | 9/2014 | Jain | H04L 63/164 |
| | | | 726/13 |
| 2015/0026793 A1* | 1/2015 | Li | H04L 63/1458 |
| | | | 726/12 |
| 2017/0163693 A1* | 6/2017 | Skuratovich | H04L 69/161 |
| 2019/0215729 A1* | 7/2019 | Oyman | H04L 65/1016 |
| 2022/0050738 A1* | 2/2022 | Kanagovi | G06F 11/1453 |

OTHER PUBLICATIONS

Extended European Search Report for EP Application No. 24176289.7 mailed Aug. 23, 2024, 7 pages.

* cited by examiner

PROVISIONAL RESPONSE HANDLING IN SIP CALLS

TECHNICAL FIELD

Various embodiments of the present technology generally relate to the handling of provisional session initiation protocol (SIP) responses within a network, such as between communication devices. More specifically, embodiments of the present technology relate to systems and methods for handling a large number of provisional responses within a selected period of time.

BACKGROUND

Mobile or internet communications can be used to connect remote systems and devices, allowing for distributed and efficient processing, resource use, and intercommunication. The Session Initiation Protocol (SIP) is a signaling protocol that may be used for initiating, maintaining, modifying, and terminating communication sessions between communication devices. An example embodiment of SIP is defined in Internet Engineering Task Force's (IETF) Request for Comments (RFC) 2543. SIP can be used for communication sessions that include voice, video, and messaging applications, such as mobile phone calling over voice over internet protocol (VOIP), voice over long-term evolution (VOLTE), internet telephony, and private IP telephone systems. Examples of SIP-based communications may include telephone calls, video conferencing, instant messaging, content sharing, and other forms of unified communications.

SIP may be based on request and response transactions, which may include a SIP request and at least one response. The request-response sessions may occur between SIP user agents or user equipment, with a user agent client (UAC) issuing requests and a user agent server (UAS) responding to the requests. A single user agent may act as both UAC and UAS for different transactions (e.g., a telephone device initiating a call or receiving a call), or may even act as both UAC and UAS within a single transaction. SIP responses typically comprise three-digit integer response codes, such as 1XX (provisional or informational), 2XX (success), 3XX (redirection), 4XX (client error), 5XX (server error), and 6XX (global failure).

A Proxy Call Session Control Function (P-CSCF) or Session Border Controller (SBC) (generally referred to as a SIP session proxy, SIP proxy, or proxy server) may include a SIP proxy that is a first point of contact for user agents in a mobile network, with all requests and responses to and from the user agents passing through the P-CSCF. The P-CSCF may receive requests from a UAC and process and forward them to the UAS, and receive responses from the UAS and process and forward them to the UAC. During a call, if a UAS sends multiple messages (e.g., provisional 1XX responses, and particularly those in the 18X range) in response to a SIP INVITE request in quick succession, the P-CSCF/SBC may queue the incoming responses without checking if they are retransmissions or different messages. The queuing mechanism may work fine when the incoming responses are limited before the final answer (e.g., 200 OK) comes. However, when the P-CSCF/SBC receives a burst of 18X responses, indicating a possible distributed denial of service (DDoS) attack, the queue may become full with potentially duplicative or useless responses. When the queue becomes full, further responses may be dropped and lost, even if those responses are new or useful. Accordingly, there exists a need for a solution to reliably handle bursts of provisional responses in SIP calls.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing provisional response handling in SIP calls. In an embodiment, a proxy server for session initiation protocol (SIP) calls may comprise one or more processors, and a memory having stored thereon instructions. The instructions, upon execution, may cause the one or more processors to initiate processing of a first SIP response, receive a second SIP response, and add the second SIP response to a message queue. The instructions may further cause the one or more processors to receive a third SIP response having a response identifier, compare the response identifier to responses in the message queue, and drop the third SIP response based on the response identifier matching a response in the message queue.

In some embodiments, the proxy server may add the third SIP response to the message queue based on the response identifier not matching a response in the message queue. The proxy server may receive the first SIP response from a user agent server (UAS), finish processing the first SIP response, forward the first SIP response to a user agent client (UAC), and retrieve a next response from a head of the message queue to process. According to some embodiments, the response identifier includes a Session Description Protocol (SDP) value. In some examples, the proxy server may start a queue timer when the first SIP response is received, and based on the queue timer being active, compare response identifiers for received responses to the responses in the message queue. The proxy server may further monitor for a trigger event for the message queue, and when the trigger event occurs, start a queue timer and drop all received responses while the queue timer is active. In some embodiments, the trigger event comprises a selected number of SIP responses received within a selected period of time. In another example, the trigger event comprises a threshold capacity of the message queue being reached.

In an alternative embodiment, a method may comprise operating a proxy server for session initiation protocol (SIP) calls, including initiating processing of a first SIP response, monitoring for a trigger event for a message queue used to store SIP responses received while another SIP response is being processed, starting a queue timer when the trigger event occurs, and dropping all received responses while the queue timer is active.

In an alternative embodiment, a memory device may store instructions that, when executed, cause a processor to perform a method comprising operating a proxy server for session initiation protocol (SIP) calls, including initiating processing of a first SIP response, receiving a second SIP response, and adding the second SIP response to a message queue used to store SIP responses received while another SIP response is being processed. The method may further comprise receiving a third SIP response having a response identifier, and comparing the response identifier to responses in the message queue. The method may include adding the third SIP response to the message queue when the response identifier does not match a response in the message queue, and dropping the third SIP response when the response identifier does match a response in the message queue. The method may also comprise monitoring for a trigger event for the message queue, starting a queue timer when the trigger event occurs, and dropping all received responses while the queue timer is active.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
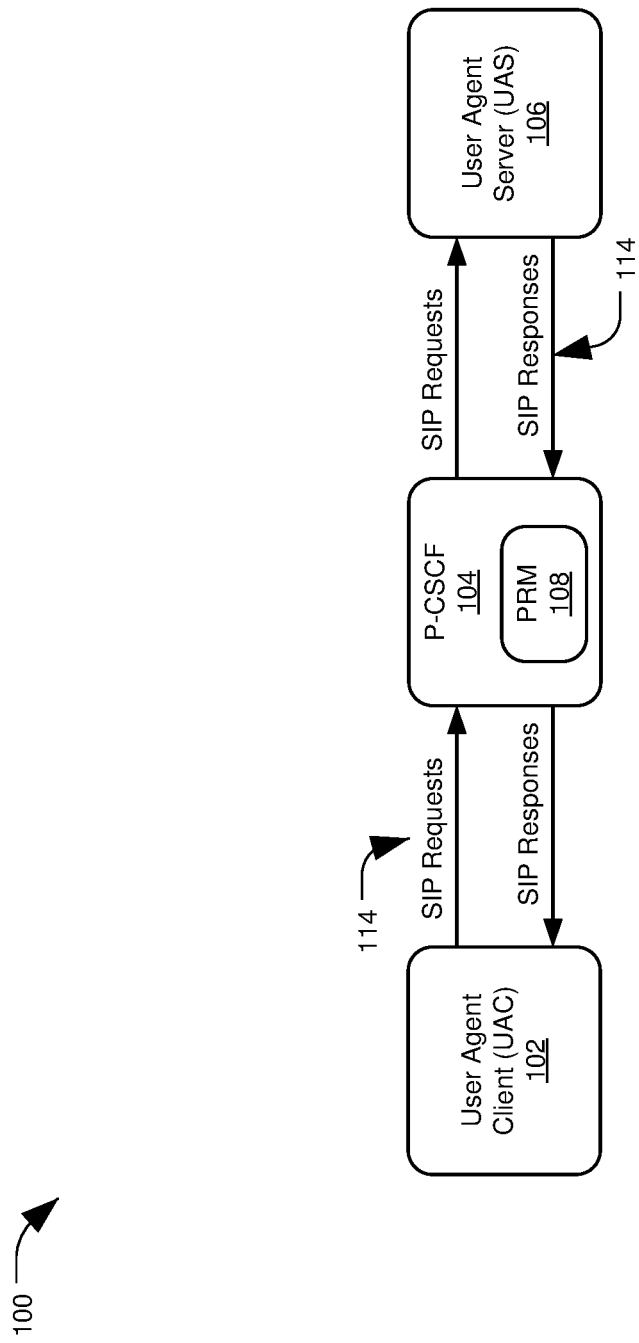
FIG. 1 is a diagram of an operational environment of a system configured for provisional response handling in SIP calls, in accordance with certain embodiments of the present disclosure.

Some components or operations may be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured for provisional response handling in session initiation protocol (SIP) calls, in accordance with certain embodiments of the present disclosure. The example system 100 may include an internet or other mobile network utilizing the SIP signaling protocol, although the present disclosure may apply to other communication networks. The system 100 may include a User Agent Client (UAC) 102, a Proxy Call Session Control Function (P-CSCF) or Session Border Controller (SBC) (generally referred to as a SIP session proxy, but for simplicity referred to herein as P-CSCF) 104, and User Agent Server (UAS) 106. Components of system 100 may communicate by exchanging SIP requests and SIP responses via network connectivity components 114.

Network connectivity components 114 may comprise components that enable communication over communication links, such as network cards, ports, radio frequency (RF) modules, telecommunications channels, cell towers, processing circuitry and software, or other communication components. Network connectivity components 114 may include metallic, wireless, cellular, or optical links, using various communication formats and protocols. In some examples, network connectivity components 114 may simply be referred to as a "network" by which systems or modules are connected or communicate.

UAC 102 and UAS 106 may each include a device, system, or module that operates as a client-side component for initiating or responding to SIP requests, to establish and participate in a communication session. UAC 102 and UAS 106 may include mobile devices such as cell phones, tablets, or modems, or other devices such as desktop computers, laptop computers, servers, set-top boxes, etc. In the examples herein, the UAC 102 may include a component that initiates a SIP request to a UAS 106. The SIP signaling protocol specification defines a number of possible requests; in the examples herein, an "INVITE" request may be issued by the UAC 102 to invite the UAS 106 to join a communication session. The UAS 106 may ultimately receive the INVITE request, and send one or more responses back to the UAC 102. The UAS 106 may be an application with which a user interacts, so upon receipt of a SIP request, some form of notification from the UAS 106 to the user might take place.

Prior to ultimate success or failure to establish a communication session, the UAS 106 may send one or more provisional responses (e.g., 18X) indicating a status of an attempt to establish a session. Some example 1XX provisional responses may include:

180 Ringing—Destination user agent received INVITE, and is alerting user of call.

181 Call is Being Forwarded—A UAS 106 can optionally send this response to indicate a call is being forwarded.

182 Queued—Indicates that the destination was temporarily unavailable, so the UAS 106 has queued the call until the destination is available. A server 106 may send multiple 182 responses to update progress of the queue.

183 Session Progress—This response may be used to send extra information for a call which is still being set up.

199 Early Dialog Terminated—Can be used to indicate to upstream SIP entities (including the UAC 102) that an early dialog has been terminated.

P-CSCF 104 may be a proxy server that acts as an intermediary that can service requests or forward them to other UASs 106 or UACs 102 for servicing. Each message from UAC 102 or UAS 106 may be routed to P-CSCF 104. The P-CSCF 104 may process each message, such as adding or removing its own identifier or address to the message, determining the destination user agent to which to forward the message, querying a location service such as a lightweight directory access protocol (LDAP) directory service, performing name mapping, or other operations. In some examples, messages may be routed through more than one proxy server 104 before arriving at the destination user agent.

As discussed herein, a UAS 106 may send multiple responses (e.g., provisional 18X responses) back to the UAC 102 via the P-CSCF 104 within a selected (generally short) time period. If the P-CSCF 104 is still processing a previous response when it receives a next response, it may add the next response to a message queue for processing in turn, so that each response may be forwarded to the UAC 102. If too many responses are received too quickly, the message queue may fill up and additional responses may be dropped or lost. Bursts of responses may fill the message queue with duplicative or unhelpful responses, which can potentially result in the loss of more important or new responses. Such a barrage or burst of responses may occur as part of a distributed denial of service (DDoS) attack or other malicious activity, for example if a malicious actor gets control of the UAS 106. This burst of responses can negatively impact communications or P-CSCF 104 operation within a system 100 (which may include additional components attempting to communicate or function).

To address bursts of SIP responses, the P-CSCF 104 may implement a provisional response handling system, such as via a provisional response module 108. Each response from UAS 106 may include a Session Description Protocol (SDP) identifier. The SDP protocol may be a declaration, by a media endpoint, of its receiving specifications and capabilities, and may typically describe which IP Address is prepared to receive the incoming media stream, which port number is listening for the incoming media stream, what media type the endpoint is expecting to receive (typically audio), which protocol the endpoint is expecting to exchange information in, which compression encoding the endpoint is capable of decoding (codec), or other details. Provisional responses from a same UAS 106 may typically share a same SDP, although in some examples a single device can provide different SDP values in its responses. For example, changing the type of a call, or location of a receiver, etc. can result in changing the SDP. The P-CSCF 104 may use SDP data in the responses (or some other response identifier), a temporal proximity of responses, or both to filter out bursts of useless responses or DDoS attacks. An example of handling a disruptive burst of SIP responses is discussed further in regard to FIG. 2.

Figure 2:
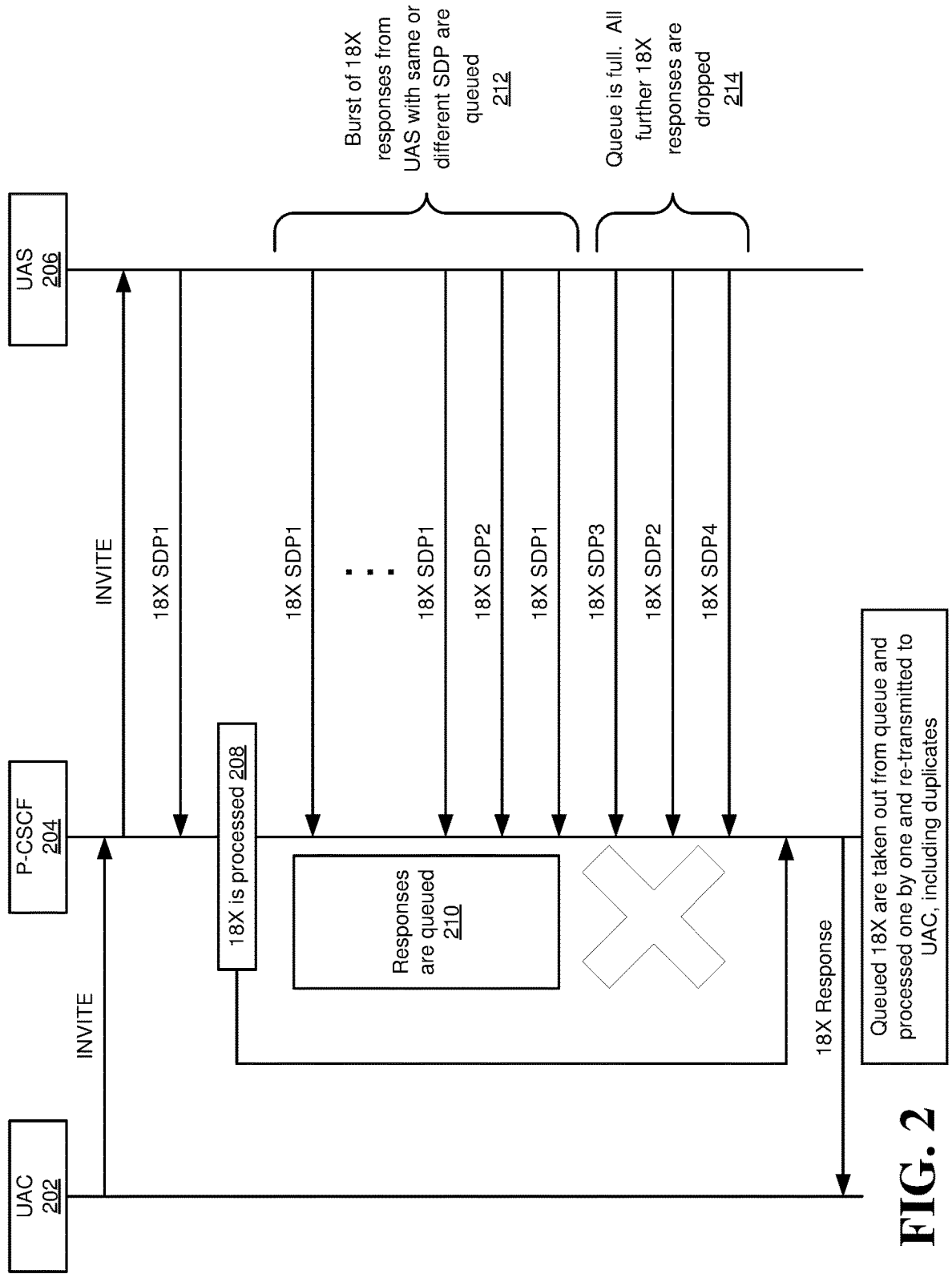
FIG. 2 is a diagram of a system configured for provisional response handling in SIP calls, in accordance with certain embodiments of the present disclosure.

FIG. 2 is a diagram 200 of a system configured for provisional response handling in SIP calls, in accordance with certain embodiments of the present disclosure. In particular, FIG. 2 may illustrate a process flow by which a P-CSCF 204 handles the receipt, processing, and forwarding of SIP requests and responses in a SIP session. The diagram 200 may include a UAC 202, P-CSCF 204, and a UAS 206. The components of diagram 200 may correspond to the components discussed in regard to FIG. 1.

The UAC 202 may send an invite request to P-CSCF 204, which may process and forward the invite to UAS 206. In response, the UAS 206 may send a first 18X provisional SIP response having a first SDP value, SDP1, to P-CSCF 204. The P-CSCF 204 may begin to process the first 18X message, at 208. While the processing 208 is occurring, further received 18X responses may be added to a message queue 210, to be processed and forwarded to UAC 202 in turn.

A burst of 18X responses may be received at the P-CSCF 204 from the UAS 206, which may have a same or different SDPs (e.g., all having SDPs 1 and 2), and those responses may all be queued, at 212. However, the message queue 210 may then become full. Further SDPs may then be dropped and lost, at 214. The dropping of responses may include the loss of new SDPs 3 and 4. At this point, the first 18X message may finish processing from 208, and may be forwarded to UAC 202. The queued 18X messages may be removed from the message queue 210 and processed one-by-one, being retransmitted to UAC 202, including the duplicate messages with the same SDP (e.g., a queue full of SDP1 and SPD2 responses). However, the response for SDP3 and SDP4 may never be forwarded to UAC 202. Accordingly, an improved implementation is described in regard to FIG. 3.

Figure 3:
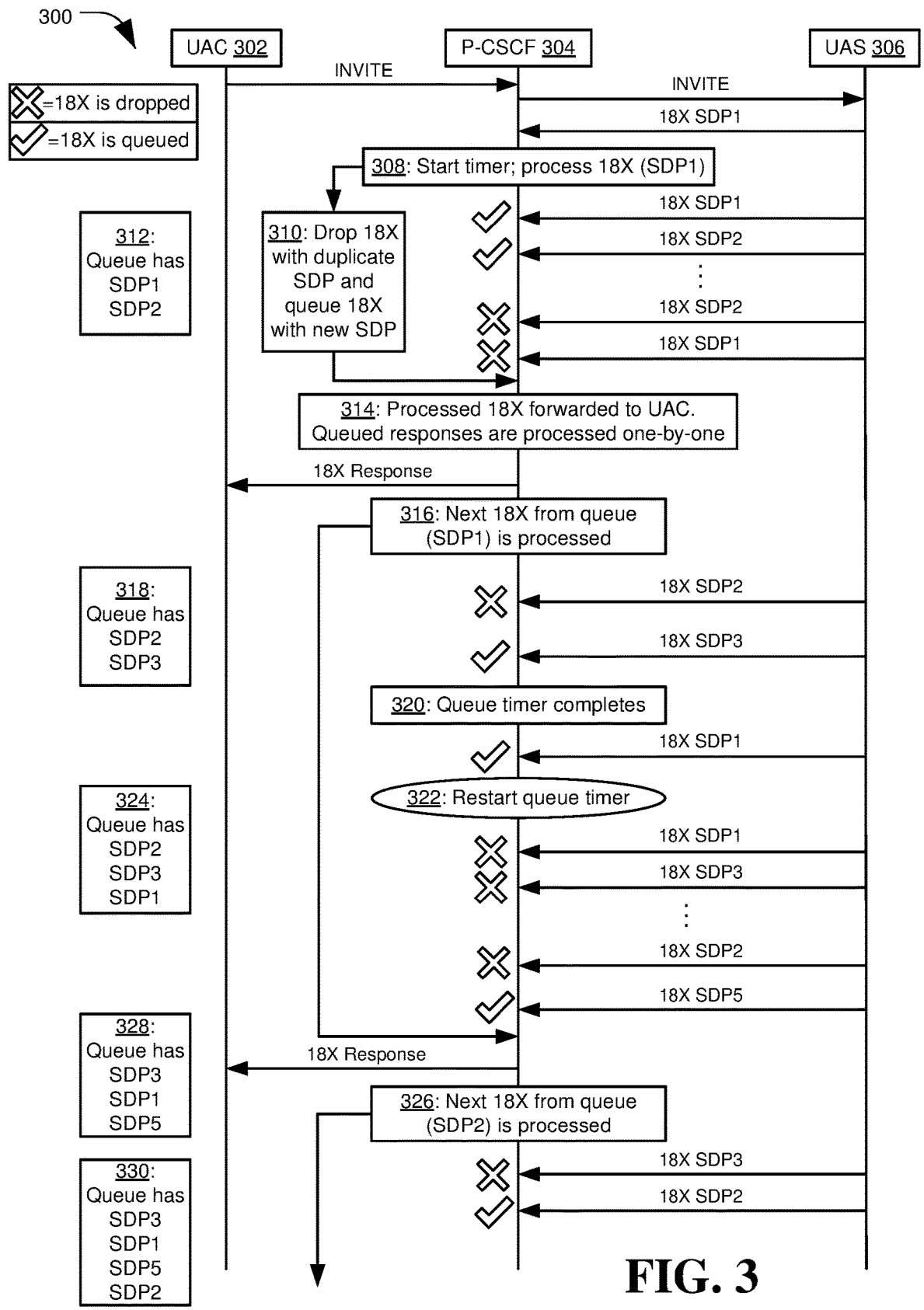
FIG. 3 is a diagram of a system configured for provisional response handling in SIP calls, in accordance with certain embodiments of the present disclosure.

FIG. 3 is a diagram 300 of a system configured for provisional response handling in SIP calls, in accordance with certain embodiments of the present disclosure. In particular, FIG. 3 may illustrate a process flow by which a P-CSCF 304 may selectively exclude SIP responses from being queued to improve performance. Responses added to the message queue may be depicted with a check mark, while responses excluded or dropped from the message queue may be depicted with an "X". The diagram 300 may include a UAC 302, P-CSCF 304, and UAS 306. The components of diagram 300 may correspond to the components discussed in regard to FIGS. 1 and 2.

As with FIG. 2, a UAC 302 may issue an "invite" request, which is forwarded from P-CSCF 304 to UAS 306. In response, UAS 306 may issue a first response having a provisional code 18X and a first SDP value, SDP1, which P-CSCF 304 may begin processing, at 308. A queue timer may also be started at this point, which may optionally be used for controlling or mediating responses to add to the queue.

The queue timer may be a selected duration that counts down until it expires or ends, and during which time the P-CSCF 304 may modify its operations or how it handles incoming responses from UAS 306. For example, the timer may be active during the window when 18X responses may be received (e.g., starting when a first 18X response is received and ending when a "200-OK" or other response indicating that the call has connected or failed). If the queue timer ends and another 18X response is received, the timer may be restarted. While the timer is active, the P-CSCF 304 may compare incoming responses to responses already stored to a message queue, and may drop or discard responses that appear duplicative (e.g., based on SDP values of the responses). In another example, if a certain number of 18X responses are received while the timer is running, it may cause the P-CSCF 304 to begin selectively excluding certain responses (e.g., duplicative responses) from the message queue. In another example, receiving a certain number of 18X responses within a selected time frame may cause the queue timer to start, and the P-CSCF 304 may exclude certain responses from the message queue the entire time the timer is running. In yet another example, no queue timer may be used, and the P-CSCF 304 may selectively exclude certain responses from the message queue at all times or based on other triggers. Other embodiments of employing a queue timer are also possible. The timer may be prematurely ended, the message queue may be emptied, or both upon certain triggers, such as receiving a 200-OK response or other response indicating the end of the 18X or provisional response period. For the purposes of the example of FIG. 3, the P-CSCF 304 may selectively exclude provisional responses sharing an SDP value with a response already in the message queue while the queue timer is active.

At point 310, the message queue may be empty while the first provisional response, with an SDP1 value, is currently being processed at the P-CSCF 304. Within a selected period of sending the first provisional response or receiving the INVITE message, the UAS 306 may issue a burst of additional 18X responses to the P-CSCF 304. The selected period may include, e.g., a selected number of milliseconds, a selected number of processor clock ticks or other processing cycles, a functional or operational window (such as after an INVITE message and before a "200-OK" message), or some other duration delineation. The UAS 306 may issue an 18X response with the value of SDP1. The P-CSCF 304 may compare the SDP value of the response with SDP values for any responses currently in the message queue 310. Because the initial SDP1 response is being processed and is not in the message queue 310, the current SDP1 response may be added to the queue, reflected by the check mark in FIG. 3. The next response may have the value of SDP2, which also does not match any response in the message queue, and may therefore be added to the queue.

At this point 312, the message queue now includes 18X responses having SDP values of SDP1 and SDP2. Additional provisional 18X responses in the burst having values of SDP1 and SDP2 are subsequently dropped, indicated by an "X" mark in FIG. 3.

At 314, the P-CSCF 204 has finished processing the first 18X SDP1 response, and forwards it to UAC 302. Additional queued responses may be retrieved and processed one-by-one, starting with the first response in the message queue-currently another SDP1 response, at 316. The message queue only includes an SDP2 response, so that the next 18X SDP2 response received from UAS 306 is dropped. The next 18X response may have an SDP value of SDP3, which does not match any messages in the queue, and therefore the response is added to the queue. At 318, the queue now includes responses having SDP values of SDP2 and SDP3.

At 320, the example queue timer completes or ends. Afterward, a next 18X response is received at the P-CSCF 304 from UAS 306, having an SDP value of SDP1. The SDP1 response may be added to the message queue. Based on implementation, the SDP1 response may be added to the queue because the queue does not currently have an SDP1 response, or because the queue timer is not currently active. For example, if the incoming response had the value of SDP2, and a response in queue 318 already had the SDP2 value, the incoming response may still be added to the queue because the timer is not currently active, according to certain embodiments. In other embodiments, responses with duplicative SDP values may be dropped from the queue regardless of the que timer status.

Receiving a next 18X response after the timer has completed may cause the P-CSCF 304 to restart the queue timer, at 322. At point 324, the message queue now includes responses having SDP values of SDP2, SDP3, and SDP1. The incoming burst of response from UAS 306 having any of those SDP values are therefore dropped. However, an incoming response with a new value of SD5 does not match any responses in queue 324 and therefore gets added to the queue. At this point, the processing of the latest 18X response completes (the first SDP1 retrieved from the queue at 316), and is returned to UAC 302.

Figure 4:
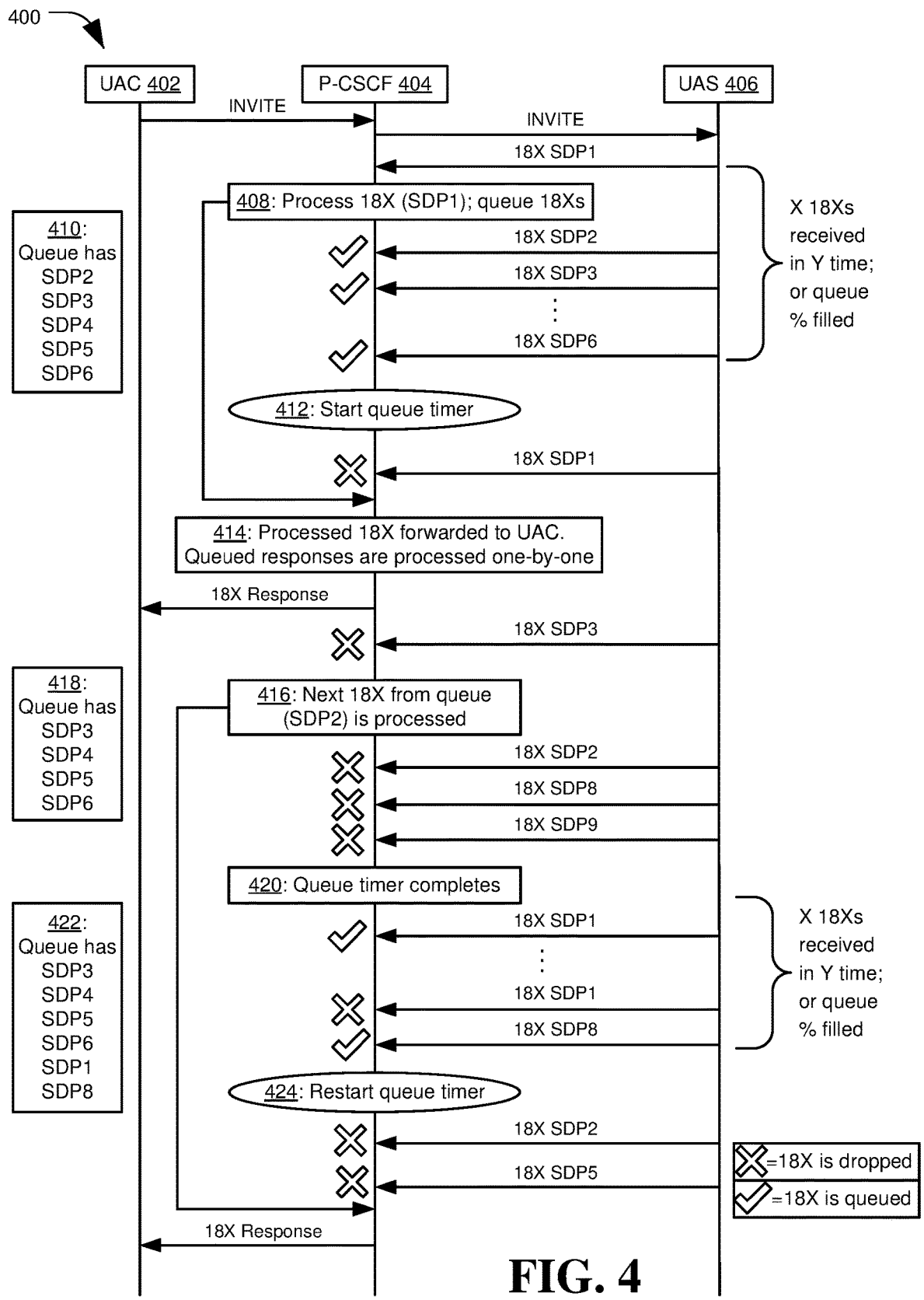
FIG. 4 is a diagram of a system configured for provisional response handling in SIP calls, in accordance with certain embodiments of the present disclosure.

A next response is retrieved from the head of the queue for processing, being an SDP2 response, at 326. At 328, the message queue now includes responses having SDP values of SDP3, SDP1, and SDP5. Accordingly, a next response from UAS 306, having an SDP3 value, is dropped, but the next response having an SDP2 value is added to the queue. At point 330, the queue now includes responses having SDP values of SDP3, SDP1, SDP5, and SDP2. The processing of responses at the P-CSCF 304 may continue as described. According to the depicted embodiment, the number of responses added to the message queue, and the number of duplicative responses being processed and forwarded to UAC 302, has been greatly reduced relative to the embodiment of FIG. 2. The example of FIG. 3 may improve overall performance of the P-CSCF 304, and limit or eliminate the number of potentially useful and non-duplicative messages that get dropped from the message queue. FIG. 4 depicts another example embodiment of provisional response handling.

FIG. 4 is a diagram 400 of a system configured for provisional response handling in SIP calls, in accordance with certain embodiments of the present disclosure. In particular, FIG. 4 may illustrate a process flow by which a P-CSCF 404 may selectively exclude SIP responses from being queued to improve performance. Responses added to the message queue may be depicted with a check mark, while responses excluded or dropped from the message queue may be depicted with an "X". The diagram 400 may include a UAC 402, P-CSCF 404, and UAS 406. The components of diagram 400 may correspond to the components discussed in regard to FIGS. 1 and 2.

While the embodiment of FIG. 3 depicted a P-CSCF dropping incoming responses that have a duplicative SDP value with responses already in a message queue, that embodiment still allowed in responses having different SDP values. However, in some situations a UAS 406 may be configured to send out responses with a wide range of SDP values as part of a DDoS attack or similar performance-disrupting operation. By sending out responses with many different SDP values, the P-CSCF 404 performance may still be disrupted if only responses with duplicative SDP values are dropped, as in system 300. Accordingly, the system 400 may be configured to drop all provisional responses when a selected number of responses are received within a selected period of time, regardless of whether the responses have same or different SDP values. In the example of FIG. 4, the P-CSCF 404 may only start the queue timer after a selected number of responses are received within a selected period of time, and all responses may be dropped while the queue timer is active.

In some examples, the embodiments of FIGS. 3 and 4 may be combined. For example, the P-CSCF 404 may automatically compare incoming 18X responses to those already included in a message queue, and may drop all responses that have duplicative SDP values, without any associated timer being active. However, if a certain number of responses (or, e.g., a certain number of responses with different SDP values) are received within a selected period of time, the P-CSCF 404 may start a timer. While the timer is active, all incoming 18X responses may be dropped, regardless of whether their SDP value matches a response already in the queue. This example embodiment would prevent both duplicative responses from being queued, and also prevent the P-CSCF 404 from being overwhelmed by responses with different SDP values.

Turning now to the process flow of FIG. 4, a UAC 402 may issue an "invite" request, which is forwarded from P-CSCF 404 to UAS 406. In response, UAS 406 may issue a first response having a provisional code 18X and a first SDP value, SDP1, which P-CSCF 404 may begin processing, at 408. The UAS 406 may continue to send a burst of 18X responses to P-CSCF 404, with some or all of the responses having different SDP values (e.g., SDP1 through SDP6). Each (or non-duplicative) response may be added to a message queue, resulting in a queue with responses having SDP values from SDP1 to SDP6, at 410.

The P-CSCF 404 may monitor a number of responses received in a period of time (e.g., a selected actual time duration, a number of processor cycles, or other duration), or a queue fill threshold. For example, when a selected number "X" of 18X responses are received within a selected period of time "Y", the P-CSCF 404 may start a queue timer, at 412. In another example, if the P-CSCF 404 determines that the queue is, e.g., 80% full, the P-CSCF 404 may start the queue timer. The amount of responses, the time within which the responses are received, or the queue fill threshold may be configurable settings for the P-CSCF 404. As described above, the queue timer may count down or decrement until it expires or ends. While the queue timer is active, the P-CSCF 404 may be configured to drop all incoming responses from UAS 406 (or only selected types of responses, such as 18X responses). Accordingly, the next received response having an SDP value of SDP1 may be dropped, even though there is no response with SDP1 in the queue 410.

At 414, the P-CSCF 404 may finish processing the initial 18X response, and forward the response to UAC 402. A next received response, having the SDP3 value, may be dropped because the queue timer is still active. Meanwhile, at 416, the P-CSCF 404 may retrieve the next response (SDP2) from the head of the message queue for processing. The current state 418 of the message queue may accordingly include responses having SDP values of SDP3, SDP4, SDP5, and SDP 6. The continuing burst of response from UAS 406 may include SDP2, SDP8, and SDP9, all of which may be dropped because the queue timer is still active. This may occur even though none of SDP2, SDP8, and SDP9 are duplicative with responses in the queue 416.

At 420, the queue timer may complete or expire. After the timer expires, additional responses from UAS 406 may be received. The P-CSCF 404 may monitor the incoming responses over time to determine whether to restart the timer. The incoming responses may include a first response having an SDP1 value, which may be added to the queue because the timer is not active and the SDP value is not duplicative with other responses in the queue 418. A second SDP1 response may also be received, which may be dropped for being duplicative with the SDP1 response that was just added to the queue. A next response may have an SDP8 value, which may also be added to the queue for not being duplicative with an existing queue entry. Accordingly, the queue at 422 may include responses with SDP values of SDP3, SDP4, SDP5, SDP6, SDP1, and SDP8.

As the burst of responses received after the timer expired at 420 may include "X" 18X responses received in "Y" time, the P-CSCF 404 may restart the queue timer at 424. Alternately, the P-CSCF 404 may determine whether the message queue is still over a selected threshold full when the timer expires, and restarts the timer as soon as it is determine the queue is the selected percentage or amount full. Accordingly, the subsequently received response (SDP2 and SDP5) may be dropped, regardless of whether they are duplicative with existing responses in the queue 422. The P-CSCF 404 may complete processing the current response and forward it to UAC 402, and retrieve a next response from the head of the queue, as appropriate. A method for provisional response handling is described in regard to FIG. 5.

Figure 5:
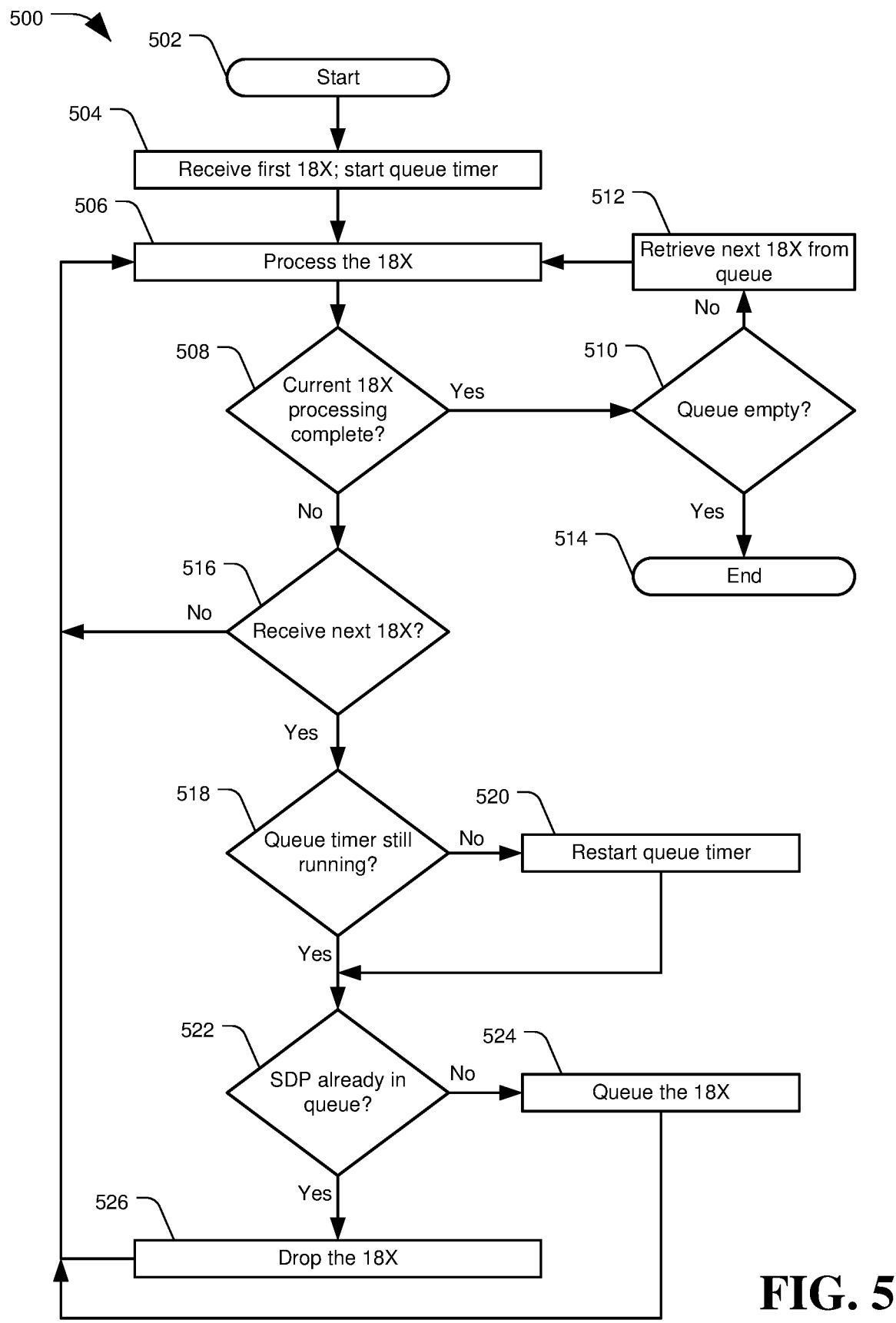
FIG. 5 depicts a flowchart of an example method for provisional response handling in SIP calls, in accordance with certain embodiments of the present disclosure.

FIG. 5 depicts a flowchart 500 of an example method for provisional response handling in SIP calls, in accordance with certain embodiments of the present disclosure. In particular, the method of FIG. 5 depicts an example process for selectively dropping or not queuing provisional SIP responses that have a duplicative session description protocol (SDP) identifier or value with responses in a message queue. The method may be performed by a proxy call session control function (P-CSCF), such as P-CSCF of FIGS. 1-4 or provisional response module (PRM) 108 of FIG. 1.

The method may start at 502, and then may include receiving a first provisional or 18X response as part of a SIP communication session (e.g., after forwarding an invitation request from a UAC to a UAS), at 504. The method may optionally include starting a queue timer based on receiving a provisional response when the timer is not active. In some embodiments, the queue timer may be started when the P-CSCF determines that a message or response queue has reached a selected threshold (e.g., a percentage full or a number of responses queued), rather than whenever a provisional response is received. The selective discarding or dropping of responses may optionally only be performed when the timer is active (and therefore potentially when message queue is becoming too full). The method may include processing the received 18X response, at 506.

At 508, a determination may be made whether the current 18X response processing operation has been completed. If it has, a determination may be made whether the message or response queue is empty, at 510. If it is, then all response processing has been completed, and the method may end, at 514. However, if the queue is not empty, the method may include retrieving a next 18X response from the head of the queue, at 512, and processing the response, at 506.

If processing of the current 18X response is not complete, at 508, the method may include determining whether a next 18X response has been received, at 516. If not, the method may include continuing to process the current 18X response, at 506. However, if a next 18X response has been received, the method may include determining whether the queue timer is still running, at 518. If not, the method may include restarting the queue timer, at 520.

When the queue timer is running (from 518 or 520), the method may include determining whether the most recently received 18X response (from 516) has an SDP value that is the same as a response already in the message queue, at 522. If not, the method may include queueing the received 18X into the message queue, at 524. However, if the SDP value of the received 18X response does match one from the queue, the method may include dropping the 18X response without queueing it, at 526. After queueing or dropping the most recent 18X response, the method may include continuing to process the current 18X response, at 506.

As described herein, maintaining a timer may be optional for selectively discarding 18X responses that have duplicative SDP values with responses in the queue. However, the timer provides extensible solution options for provisional response handling in SIP calls. Another example of provisional response handling employing a queue timer is described in regard to FIG. 6.

Figure 6:
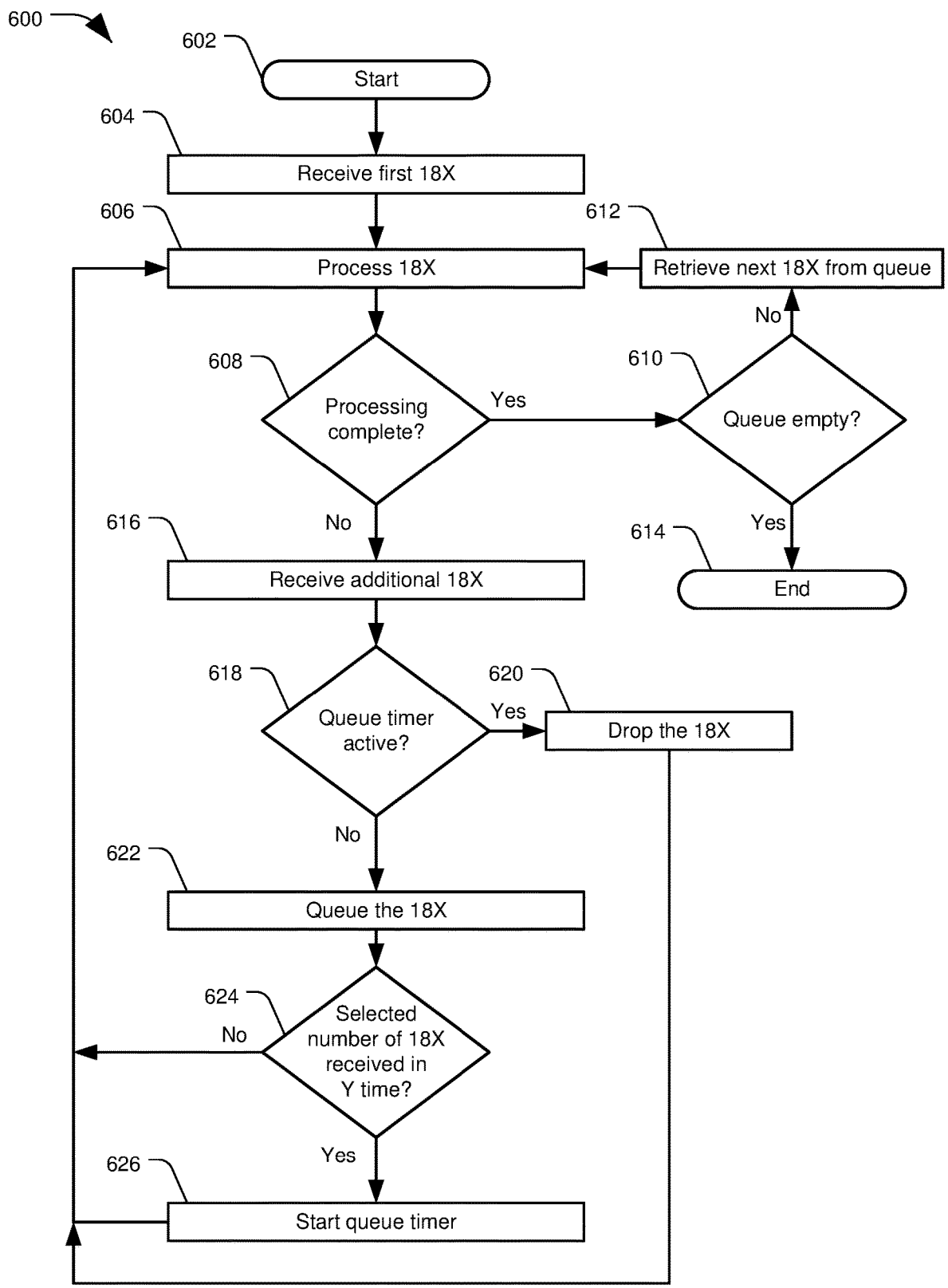
FIG. 6 depicts a flowchart of an example method for provisional response handling in SIP calls, in accordance with certain embodiments of the present disclosure.

FIG. 6 depicts a flowchart 600 of an example method for provisional response handling in SIP calls, in accordance with certain embodiments of the present disclosure. In particular, the method of FIG. 6 depicts an example process for selectively dropping or not queuing provisional SIP responses that have a duplicative session description protocol (SDP) identifier or value with responses in a message queue. The method may be performed by a proxy call session control function (P-CSCF), such as P-CSCF of FIGS. 1-4 or provisional response module (PRM) 108 of FIG. 1.

The method may start at 602, and then may include receiving a first provisional or 18X response as part of a SIP communication session (e.g., after forwarding an invitation request from a UAC to a UAS), at 604. The method may include processing the received 18X response, at 606.

At 608, a determination may be made whether the current 18X response processing operation has been completed. If it has, a determination may be made whether the message or response queue is empty, at 610. If it is, then all response processing has been completed, and the method may end, at 614. However, if the queue is not empty, the method may include retrieving a next 18X response from the head of the queue, at 612, and processing the response, at 606.

If processing of the current 18X response is not complete, at 608, the method may include receiving one or more additional 18X responses, at 616. When a new response is received, the method may include determining whether a queue timer is active, at 618. The queue timer may comprise a default or configured amount of time that may count down until it expires, and which may adjust or influence what SIP responses, if any, are queued while the timer is active. If the timer is active, the method may include dropping the one or more additional 18X responses, at 620. The 18X responses may be dropped whether or not the SDP values for the responses match SDP values of responses already in a message queue. In another embodiment, the method may include dropping only responses that have an SDP value that matches an SDP value from the message queue. After dropping the one or more 18X responses, the method may include continuing to process a current 18X response, at 606.

If the queue timer was not active, at 618, the method may include queueing the one or more additional 18X responses. In some examples, all of the 18X responses received while the timer is inactive may be queued. In other embodiments, duplicative 18X responses, or those having an SDP value the same as a response already in the queue, may be dropped rather than queued.

Once the one or more additional 18X responses have been queued (or dropped) at 622, the method may include determining whether a trigger has been reached, such as whether a selected number of 18X responses have been received within a selected period of time or duration, at 624. In another example, the trigger may be whether the message queue has reached a capacity threshold (e.g., 50% full) or selected number of queued responses. The selected number of received responses, the selected time period over which the number of received responses is checked, the selected queue capacity threshold, or the selected number of queued responses may be preconfigured or fixed, or may be configurable (e.g., via a command line interface for a P-CSCF). If the trigger has been reached, the method may include starting the queue timer, at 626. The duration of the queue timer may similarly be preconfigured or fixed, or configurable. Once the queue timer has been started at 626, or if the trigger has not been reached at 624, the method may include continuing to process the current 18X response, at 606. An example computing system configured to perform the operations and processes described herein is shown in FIG. 7.

Figure 7:
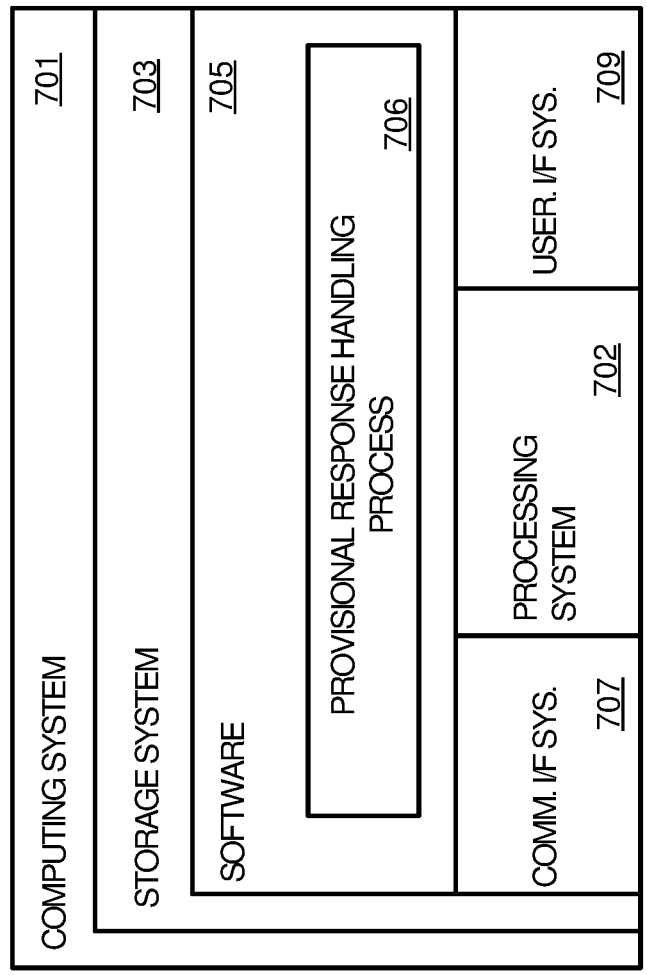
FIG. 7 illustrates a computing system configured for provisional response handling in SIP calls, in accordance with some embodiments of the present technology.

FIG. 7 illustrates an apparatus 700 including a computing system 701 that is representative of any system or collection of systems in which the various processes, systems, programs, services, and scenarios disclosed herein may be implemented. For example, computing system 701 may be an example of UAC 102, UAS 106, P-CSCF/SBC 104, or PRM 108 of FIG. 1. Examples of computing system 701 include, but are not limited to, server computers, desktop computers, laptop computers, routers, web servers, cloud computing platforms, and data center equipment, as well as any other type of physical or virtual server machine, physical or virtual router, container, communications network equipment, and any variation or combination thereof.

Computing system 701 may be implemented as a single apparatus, system, or device or may be implemented in a distributed manner as multiple apparatuses, systems, or devices. Computing system 701 may include, but is not limited to, processing system 702, storage system 703, software 705, communication interface system 707, and user interface system 709. Processing system 702 may be operatively coupled with storage system 703, communication interface system 707, and user interface system 709.

Processing system 702 may load and execute software 705 from storage system 703. Software 705 may include and implement a provisional response handling process 706, which may be representative of any of the operations for monitoring SIP call responses (e.g., provisional 18X responses) for frequency, content, identifiers, or other factors, and determining when to queue responses and when to selectively drop responses to improve system performance, as discussed with respect to the preceding figures. When executed by processing system 702 to perform provisional response handling, software 705 may direct processing system 702 to operate as described herein for at least the various processes, operational scenarios, and sequences discussed in the foregoing implementations. Computing system 701 may optionally include additional devices, features, or functionality not discussed for purposes of brevity.

In some embodiments, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 may include general purpose central processing units, graphical processing units, application specific processors, and logic devices, as well as any other type of processing device, combinations, or variations thereof.

Storage system 703 may comprise any memory device or computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including provisional response handling process 1006 among other functions) may be implemented in program instructions that may, when executed by processing system 702, direct processing system 702 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to implement the systems and processes as described herein. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of internet-based or 5G communication networks operated in a cloud environment, it should be understood the systems and methods described herein are not limited to such embodiments, and may apply to a variety of other communication networks and resource discovery request environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise." "comprising," "including," and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. Except when used for the selection or determination between alternatives, the word "or" in reference to a list of two or more items covers all the following interpretations of the word: any of the items in the list, all the items in the list, and any combination of the items in the list.

The phrases "in some embodiments," "according to some embodiments," "in the embodiments shown," "in other embodiments." and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A proxy server for session initiation protocol (SIP) calls, comprising:
   one or more processors; and
   a memory having stored thereon instructions that, upon execution by the one or more processors, cause the one or more processors to:
   initiate processing of a first SIP response;
   receive a second SIP response;
   add the second SIP response to a message queue;
   receive a third SIP response having a Session Description Protocol (SDP) identifier;
   compare the SDP identifier to SDP identifiers of responses in the message queue; and
   drop the third SIP response based on the SDP identifier matching another SDP identifier of a response in the message queue.

2. The proxy server of claim 1, further comprising:
   add the third SIP response to the message queue based on the SDP identifier not matching a response in the message queue.

3. The proxy server of claim 1, further comprising:
   receive the first SIP response from a user agent server (UAS);
   finish processing the first SIP response;
   forward the first SIP response to a user agent client (UAC); and
   retrieve a next response from a head of the message queue to process.

4. The proxy server of claim 1, further comprising:
   start a queue timer when the first SIP response is received; and
   based on the queue timer being active, compare SDP identifiers for received responses to the responses in the message queue.

5. The proxy server of claim 1, further comprising:
   monitor for a trigger event for the message queue;
   when the trigger event occurs, start a queue timer; and
   drop all received responses while the queue timer is active.

6. The proxy server of claim 5, further comprising:
   the trigger event comprises a selected number of SIP responses received within a selected period of time.

7. The proxy server of claim 5, further comprising:
   the trigger event comprises a threshold capacity of the message queue being reached.

8. A method comprising:
   operating a proxy server for session initiation protocol (SIP) calls, including:
   initiating processing of a first SIP response;
   monitoring for a trigger event for a message queue used to store SIP responses received while another SIP response is being processed;
   starting a queue timer when the trigger event occurs; and dropping all received responses while the queue timer is active.

9. The method of claim 8, further comprising the trigger event includes a selected number of SIP responses received within a selected period of time.

10. The method of claim 8, further comprising the trigger event includes the message queue reaching a threshold capacity.

11. The method of claim 8, further comprising:
receiving a second SIP response;
adding the second SIP response to the message queue;
receiving a third SIP response having a response identifier;
comparing the response identifier to responses in the message queue; and
dropping the third SIP response based on the response identifier matching a response in the message queue.

12. The method of claim 11, further comprising:
adding the third SIP response to the message queue based on the response identifier not matching a response in the message queue.

13. The method of claim 11, further comprising the response identifier includes a Session Description Protocol (SDP) value.

14. The method of claim 8, further comprising:
receiving the first SIP response from a user agent server (UAS);
finishing processing of the first SIP response;
forwarding the first SIP response to a user agent client (UAC); and
retrieving a next response from a head of the message queue to process.

15. A memory device storing instructions that, when executed, cause a processor to perform a method comprising:
operating a proxy server for session initiation protocol (SIP) calls, including:
initiating processing of a first SIP response;
receiving a second SIP response;
adding the second SIP response to a message queue used to store SIP responses received while another SIP response is being processed;
receiving a third SIP response having a Session Description Protocol (SDP) identifier;
comparing the SDP identifier to SDP identifiers of responses in the message queue;
dropping the third SIP response when the SDP identifier does match another SDP identifier of a response in the message queue;
monitoring for a trigger event for the message queue;
starting a queue timer when the trigger event occurs; and
dropping all received responses while the queue timer is active.

16. The memory device of claim 15, wherein the trigger event comprises a selected number of SIP responses received within a selected period of time.

17. The memory device of claim 15, wherein the trigger event comprises a threshold capacity of the message queue being reached.

18. The memory device of claim 15 storing instructions that, when executed, cause the processor to perform the method further comprising:
receiving the first SIP response from a user agent server (UAS);
finishing processing the first SIP response;
forwarding the first SIP response to a user agent client (UAC); and
retrieving a next response from a head of the message queue to process.

19. The memory device of claim 15 storing instructions that, when executed, cause the processor to perform the method further comprising:
adding the third SIP response to the message queue when the SDP identifier does not match another SDP identifier of a response in the message queue.

* * * * *